(12) United States Patent
Takahashi et al.

(10) Patent No.: US 11,462,806 B2
(45) Date of Patent: Oct. 4, 2022

(54) METAL-AIR BATTERY AND METHOD OF USING THE SAME

(71) Applicant: FUJIKURA COMPOSITES Inc., Tokyo (JP)

(72) Inventors: Masaki Takahashi, Saitama (JP); Tsutomu Narita, Saitama (JP); Yuka Amamori, Saitama (JP); Hiroshi Sakama, Saitama (JP)

(73) Assignee: FUJIKURA COMPOSITES INC., Tokyo (JP)

( * ) Notice: Subject to any disclaimer, the term of this patent is extended or adjusted under 35 U.S.C. 154(b) by 24 days.

(21) Appl. No.: 17/266,155

(22) PCT Filed: Jul. 23, 2019

(86) PCT No.: PCT/JP2019/028911
§ 371 (c)(1),
(2) Date: Feb. 5, 2021

(87) PCT Pub. No.: WO2020/031688
PCT Pub. Date: Feb. 13, 2020

(65) Prior Publication Data
US 2021/0305666 A1    Sep. 30, 2021

(30) Foreign Application Priority Data
Aug. 6, 2018   (JP) .............................. JP2018-147530

(51) Int. Cl.
*H01M 50/609* (2021.01)
*H01M 50/70* (2021.01)
*H01M 12/06* (2006.01)

(52) U.S. Cl.
CPC ......... *H01M 50/609* (2021.01); *H01M 12/06* (2013.01); *H01M 50/70* (2021.01)

(58) Field of Classification Search
CPC .................................................. H01M 50/609
See application file for complete search history.

(56) References Cited

U.S. PATENT DOCUMENTS

| 4,950,561 A | * | 8/1990 | Niksa | ................. | H01M 50/50 |
|   |   |   |   |   | 429/406 |
| 2019/0207282 A1 | * | 7/2019 | Zhang | ................... | H01M 4/36 |
| 2019/0245253 A1 | * | 8/2019 | Krishnan | .......... | H01M 8/04014 |

FOREIGN PATENT DOCUMENTS

| JP | S52-022526 U | 2/1977 |
| JP | S54-137732 U | 9/1979 |

(Continued)

OTHER PUBLICATIONS

International Search Report for PCT/JP2019/028911 dated Oct. 8, 2019.

*Primary Examiner* — Brian R Ohara
(74) *Attorney, Agent, or Firm* — McCormick, Paulding & Huber PLLC

(57) ABSTRACT

Provided is a metal-air battery and a method of using the same that make it possible to obtain a high output while also promoting the discharge of product associated with power generation and achieve stable output over time. A metal-air battery according to the present invention comprises a metal-air battery unit provided with a plurality of metal-air battery cells in parallel, each metal-air battery cell being configured to include a metal electrode, air electrodes disposed facing each other on either side of the metal electrode, and a housing that supports the metal electrode and the air electrodes, wherein the air electrodes are exposed on an outer face on either side of the housing, a liquid chamber is formed in each housing, and in the metal-air battery unit, an air chamber that is open on top is formed between the facing air electrodes between each of the metal-air battery cells, and in each metal-air battery cell, a through-hole that (Continued)

communicates to the liquid chamber and is supplies an electrolytic solution to the liquid chamber and can also release a product produced by a reaction between the metal electrode and the air electrodes to the outside of the metal-air battery unit is formed.

12 Claims, 10 Drawing Sheets

(56) References Cited

FOREIGN PATENT DOCUMENTS

| | | |
|---|---|---|
| JP | 2016-076319 A | 5/2016 |
| JP | 2017-004644 A | 1/2017 |
| JP | 2018-67448 A | 4/2018 |
| JP | 6316529 B1 | 4/2018 |

* cited by examiner

METAL-AIR BATTERY AND METHOD OF USING THE SAME

CROSS-REFERENCE TO RELATED APPLICATIONS

This application is a National Stage application of International Patent Application No. PCT/JP2019/028911 filed on Jul. 23, 2019, which claims priority to Japanese Patent Application No. JP2018-147530 filed on Aug. 6, 2018, each of which is hereby incorporated by reference in its entirety.

TECHNICAL FIELD OF THE INVENTION

The present invention relates to a metal-air battery provided with a plurality of metal-air battery cells, and a method of using the same.

BACKGROUND OF THE INVENTION

In a metal-air battery, in an air electrode that acts as the cathode, ambient oxygen is utilized as the cathode active material, and an oxidation-reduction reaction of the oxygen is performed. On the other hand, in a metal electrode that acts as the anode, an oxidation-reduction reaction of the metal is performed. A metal-air battery has high energy density and is anticipated to function as a device such as an emergency power source during a disaster, or the like. Power generation is started by supplying an electrolytic solution to the metal-air battery.

In the related art, various metal-air battery structures have been proposed.

According to Japanese Utility Model Laid-Open No. 52-22526, a metal electrode and an air electrode are built into a cell, and an electrolytic solution is configured to be injected into a cell electrolytic solution chamber inside the cell from a seawater intake port provided in the bottom face of the cell.

According to Japanese Utility Model Laid-Open No. 54-137732, a plurality of cells are formed by plurally containing air supply boxes with an air electrode and a metal electrode attached thereto inside a battery case. The battery case is provided with an injection port, and seawater can be injected into the battery case through the injection port.

According to Japanese Patent Laid-Open No. 2017-4644, two pairs of an air electrode and a metal electrode are built into a cell, and a water supply part is disposed on the upper face of the cell. An electrolytic solution is injected from the water supply part to induce power generation.

According to Japanese Patent Laid-Open No. 2016-76319, a battery provided with a metal electrode and an air electrode affixed to a holder is placed inside a container injected with an electrolytic solution to induce power generation, and power generation is stopped by moving the holder from the container to separate the battery from the electrolytic solution.

SUMMARY OF THE INVENTION

Of the patent literatures cited above, Japanese Utility Model Laid-Open No. 52-22526 and Japanese Utility Model Laid-Open No. 54-137732 will be considered in particular. In Japanese Utility Model Laid-Open No. 52-22526, as illustrated in the second figure, the cell interior is partitioned by a partition wall (2), a cell electrolytic chamber (9) is provided in the middle, and an air chamber (7) is formed on either side of the cell electrolytic chamber (9). In the air chamber (7), an outer wall is demarcated by a side wall (8) of a unit cell, and power generation is possible with a unit cell structure. When the unit cell structure illustrated in the second figure is put into seawater, the seawater is injected into the cell electrolytic chamber (9) from a seawater intake port (12), but the seawater does not intrude into the partitioned air chamber (7). In this way, in Japanese Utility Model Laid-Open No. 52-22526, because the cell electrolytic chamber (9) and the air chamber (7) are completely partitioned into rooms by the unit cell structure, the side wall (8) is necessary as the outer wall of the air chamber (7), and in addition, it is necessary to form the air chamber (7) large enough to guide sufficient air into the air chamber (7). In ways such as these, it is necessary to increase the cell width (here, the "cell width" corresponds to the width dimension of the battery case (1) illustrated in the second figure of Japanese Utility Model Laid-Open No. 52-22526).

For this reason, when a configuration provided with a plurality of cells in parallel to obtain high output is considered, the number of cells that can be provided in parallel must be reduced to keep the total width of the plurality of cells within a predetermined range.

In other words, in Japanese Utility Model Laid-Open No. 52-22526, because air electrodes can be disposed on either side of the metal electrode and induce reactions on either side of the metal electrode, the output of the individual cells can be expected, but the number of cells cannot be increased effectively while saving space, and adequately high output cannot be obtained.

Also, in Japanese Utility Model Laid-Open No. 54-137732, an air electrode and a metal electrode are each disposed on either side of an air supply box to act as a single cell, and a plurality of such cells are disposed inside a battery case. However, with the configuration in Japanese Utility Model Laid-Open No. 54-137732, because the air electrode is disposed on only one side of the metal electrode in the configuration, high output cannot be expected. Also, in Japanese Utility Model Laid-Open No. 54-137732, product accumulates on the bottom face of the battery case, and there is no means for removing the product. For this reason, the product impedes the reaction between the metal electrode and the air electrode, and the output decreases over time.

Furthermore, with the metal-air batteries of the related art, when power generation ends, the battery becomes unusable and must be disposed of. In other words, the metal-air batteries of the related art are single-use primary batteries.

Accordingly, the present invention has been devised in light of such points, and an object thereof is to provide a metal-air battery and a method of using the same that make it possible to obtain a high output while also promoting the discharge of product associated with power generation and achieve stable output over time.

A metal-air battery according to the present invention comprises a metal-air battery unit provided with a plurality of metal-air battery cells in parallel, each metal-air battery cell being configured to include a metal electrode, air electrodes disposed facing each other on either side of the metal electrode, and a housing that supports the metal electrode and the air electrodes, wherein the air electrodes are exposed on an outer face on either side of the housing, a liquid chamber is formed in each metal-air battery cell, and in the metal-air battery unit combining the plurality of metal-air battery cells, an air chamber that is open on top is formed between the facing air electrodes between each of the metal-air battery cells, and in each metal-air battery cell, a through-hole that communicates to the liquid chamber and supplies an electrolytic solution to the liquid chamber, and can also release a product produced by a reaction between the metal electrode and the air electrodes to the outside of the metal-air battery unit is formed.

In the present invention, preferably, a lower end of the metal electrode is supported by the housing as a free end, the through-hole is formed in a bottom part of the housing, and the lower end of the metal electrode and an upper end of the through-hole face each other.

In the present invention, preferably, the lower end of the metal electrode is disposed in a position at or above the upper end of the through-hole.

In the present invention, preferably, side parts on either side of the housing where the air electrodes are disposed are configured including a securing part that secures the air electrodes and a frame part that surrounds an outer perimeter of the securing part except on top and projects out farther than the securing part, the air electrodes are affixed to the securing part, and the frame parts of the metal-air battery cells abut each other to form the air chamber that is open on top.

In the present invention, preferably, the metal electrode or the metal-air battery cell is supported by the housing in a replaceable way, and more preferably, the metal-air battery cell is supported in a replaceable way from the perspective of workability and housing design.

Preferably, the present invention comprises the metal-air battery unit described above and a power generation tank capable of containing an electrolytic solution, and in a state in which the open top of the air chamber is facing upward such that a gap is formed between a lower face of the metal-air battery unit and a bottom face of the power generation tank, the metal-air battery unit is placed inside the power generation tank containing the electrolytic solution, the electrolytic solution is injected into the liquid chamber through the through-hole, and the product is discharged through the through-hole and into the gap.

Preferably, the present invention is provided with a circulating part that circulates the electrolytic solution in the power generation tank.

Preferably, the present invention is provided with a collector that collects the product discharged into the power generation tank.

A method of using a metal-air battery according to the present invention comprises starting power generation by placing the metal-air battery unit into a power generation tank containing an electrolytic solution in a state with the open top of the air chamber facing upward such that an interval is formed between a lower face of the metal-air battery unit described above and a bottom face of the power generation tank, or by pouring the electrolytic solution into the power generation tank in which the metal-air battery unit has been disposed.

In the present invention, preferably, a liquid flow is created inside the power generation tank, and power is generated while circulating the electrolytic solution.

In the present invention, preferably, power is generated while collecting a product discharged into the power generation tank.

In the present invention, preferably, power generation is continued while replacing the metal electrode or the metal-air battery cells.

According to the metal-air battery of the present invention, it is possible to obtain a high output while also promoting the discharge of product associated with power generation, and suppressing a reduction in output over time.

DETAILED DESCRIPTION

Hereinafter, embodiments of the present invention will be described in detail. However, the present invention is not limited to the following embodiments, and may also be modified in various ways while remaining within the scope of the present invention.

Note that in the present embodiments described below with reference to the drawings, a "metal-air battery" may also refer to a metal-air battery unit in which a plurality of metal-air battery cells are provided in parallel, and may also refer to a combination of the metal-air battery unit and a power generation tank containing an electrolytic solution.

Figure 1:
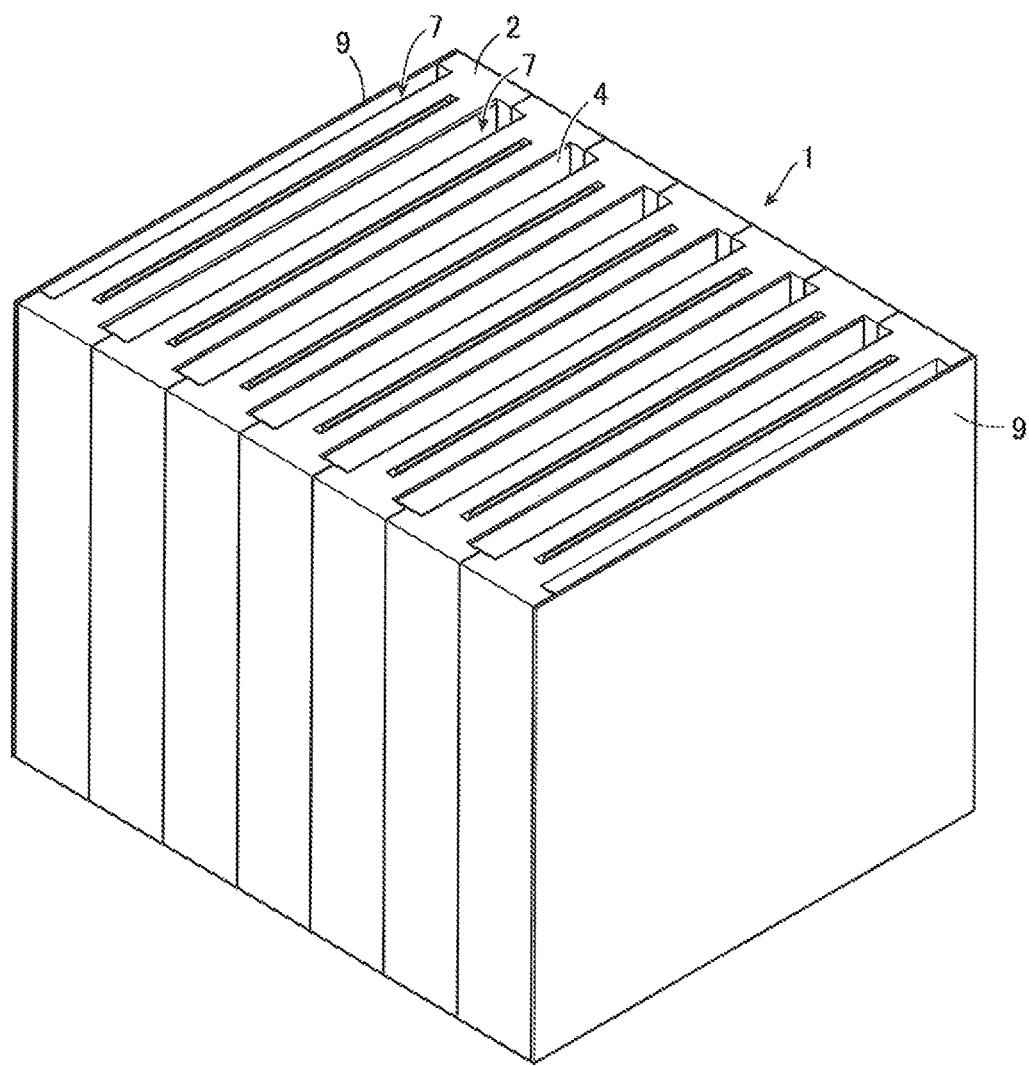
FIG. 1 is a perspective view of a metal-air battery unit according to the present embodiment.

FIG. 1 is a perspective view of a metal-air battery unit according to the present embodiment. As illustrated in FIG. 1, a metal-air battery unit 1 is configured to contain six metal-air battery cells 2 provided in parallel, for example. However, the number of metal-air battery cells 2 is not limited.

The metal-air battery unit 1 according to the present embodiment is a combination of a plurality of metal-air battery cells 2 having the same structure. The structure of a metal-air battery cell 2 will be described in detail using FIGS. 2 and 3.

Figure 2:
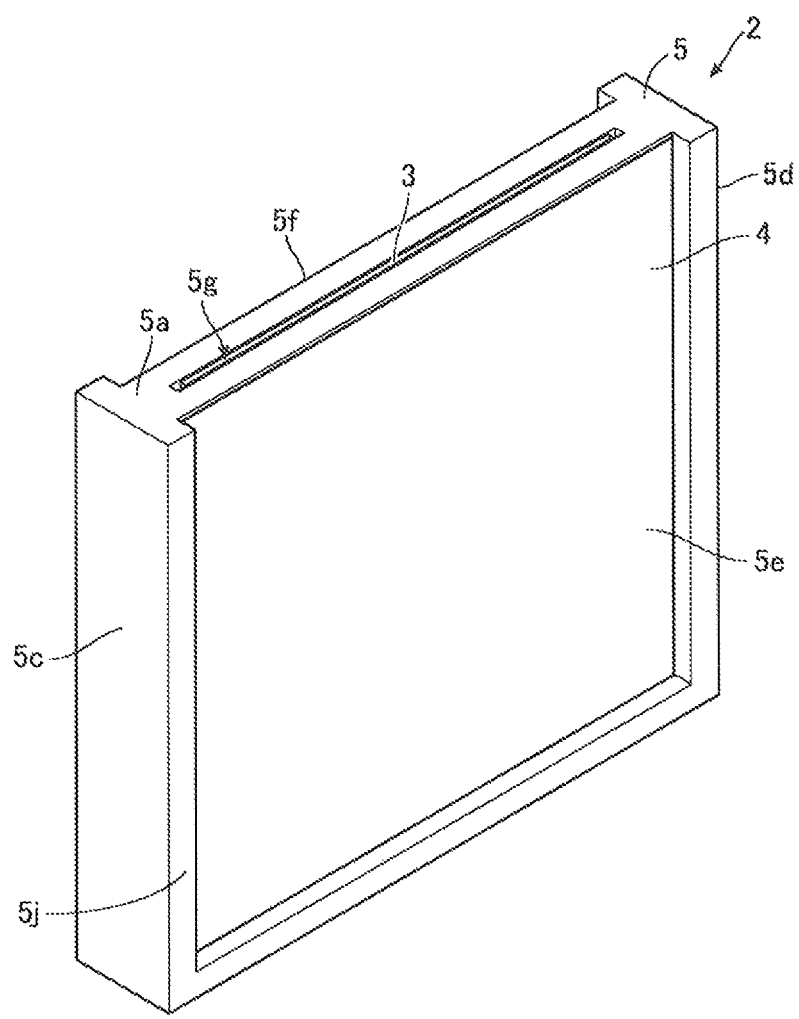
FIG. 2 is a perspective view of a metal-air battery cell according to the present embodiment.

As illustrated in FIG. 2, a metal-air battery cell 2 is configured to includes a metal electrode 3, air electrodes 4, and a housing 5 that supports the metal electrode 3 and the air electrodes 4.

Figure 3A:
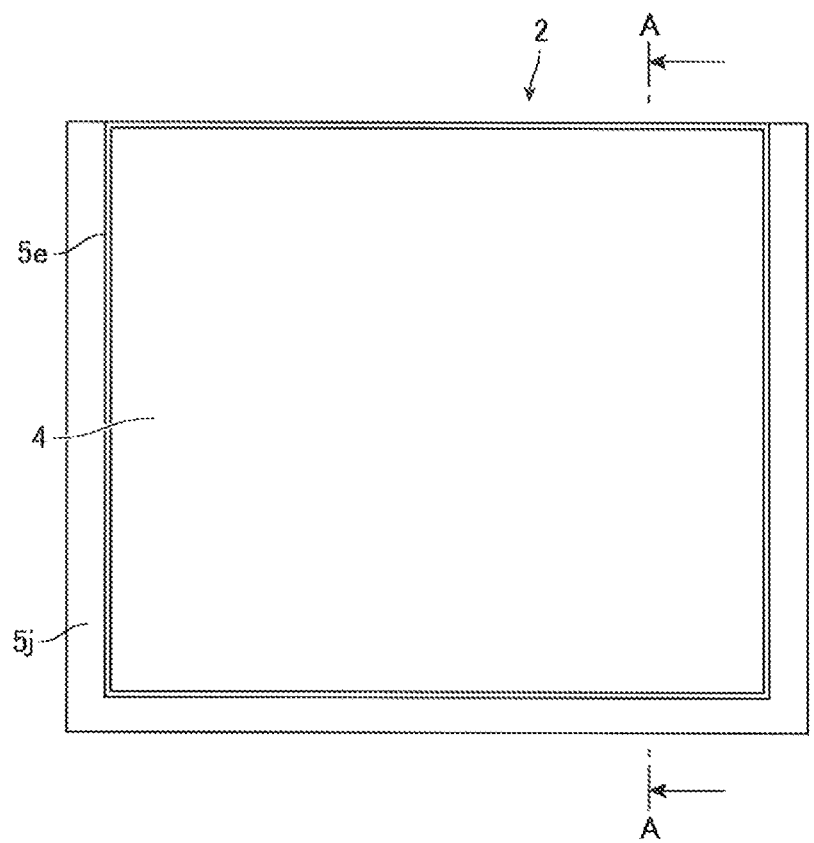
FIG. 3A is a front view of the metal-air battery cell illustrated in FIG. 2.
Figure 3B:
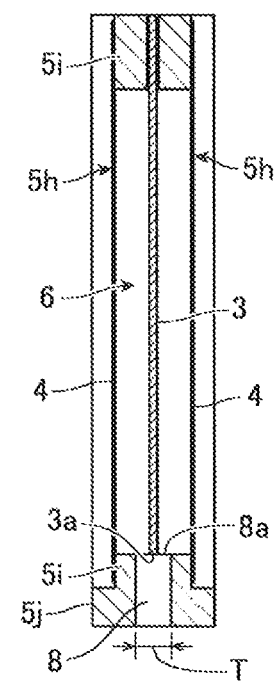
FIG. 3B is a cross-sectional view cutting the metal-air battery cell illustrated in FIG. 3A along the line A-A and viewed from the direction of the arrow.
Figure 3C:
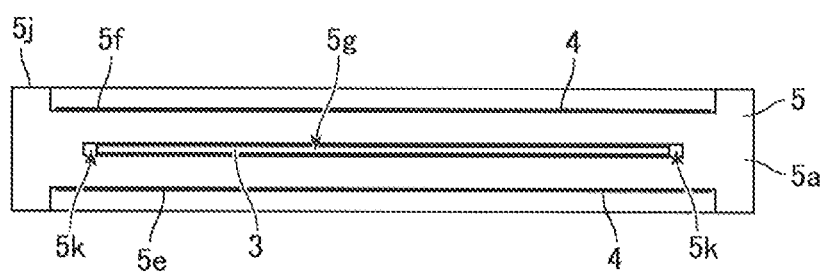
FIG. 3C is a plan view of the metal-air battery cell.

As illustrated in FIGS. 3B and 3C, the air electrodes 4 are disposed on either side of the metal electrode 3 with intervals in between, and are also exposed on an outer face on either side of the housing 5.

As illustrated in FIG. 2 and FIGS. 3A to 3D, the housing 5 has an upper part 5a, a lower part 5b, and a front part 5c, a back part 5d, and side parts 5e and 5f that join the upper part 5a and the lower part 5b. The housing 5 may be molded in a single piece, or the housing 5 may be configured by combining each of the plurally divided molded bodies.

The upper part 5a, the lower part 5b, the front part 5c, and the back part 5d of the housing 5 are formed to have substantially flat surfaces. However, the upper part 5a is provided with a slit 5g, and the metal electrode 3 is fixed and supported inside the slit 5g. As illustrated in FIG. 3C, the width of the slit 5g formed in the upper part 5a of the housing 5 of the metal-air battery cell 2 is greater than the width of the metal electrode 3. Communication holes 5k leading to a liquid chamber 6 described later are formed between the metal electrode 3 and the slit 5g.

The side parts 5e and 5f of the housing 5 are each provided with a window 5h (see FIG. 3B). Also, a securing part 5i that surrounds the entire perimeter on the upper side, lower side, left side, and right side of each window 5h is formed. In FIG. 3B, the securing part 5i positioned on the upper side and lower side of the windows 5h is illustrated, but in actuality, the securing part 5i also exists on the left side and right side of the windows 5h, and the entire perimeter of each window 5h is surrounded by the securing part 5i.

As illustrated in FIG. 3B, each air electrode 4 is affixed to the securing part 5i of each of the side parts 5e and 5f with an adhesive or the like, and closes up each window 5h. By closing up the windows 5h respectively provided in the side parts 5e and 5f of the housing 5, a liquid chamber 6 is formed between the air electrodes 4 affixed to the side parts 5e and 5f. The liquid chamber 6 is enclosed except for a through-hole 8 that acts as a supply port for an electrolytic solution described later.

As illustrated in FIGS. 2, 3A, 3B, and 3C, a frame part 5j is formed around the outer perimeter of the securing part 5i except the upper side. In other words, the frame part 5j is formed to enclose the lower side, left side, and right side of the securing part 5i. Additionally, the frame part 5j also projects farther outward than the securing part 5i. For this reason, a step is formed between the frame part 5j and the securing part 5i. As illustrated in FIGS. 2, 3B, and 3C, the air electrodes 4 are disposed at positions recessed (farther back) from the surface of the frame part 5j. Consequently, a space that is open above and in front of each air electrode 4 is formed between the air electrode 4 and the frame part 5j. By providing a plurality of metal-air battery cells 2 in parallel, this space configures an air chamber 7 that is open only on top (see FIG. 4).

Figure 3D:
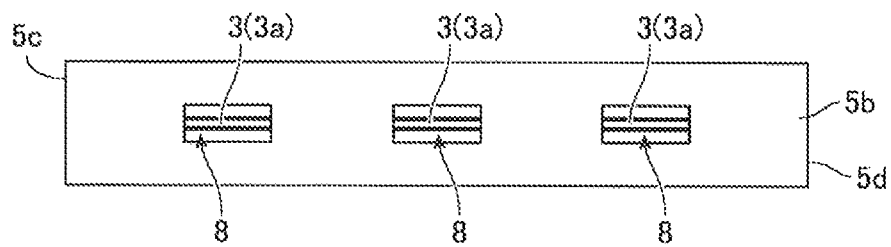
FIG. 3D is a back view of the metal-air battery cell.

As illustrated in FIGS. 3B and 3D, through-holes 8 leading to the liquid chamber 6 are formed in the lower part 5b of the housing 5. A width dimension T of the through-hole 8 is greater than the thickness of the metal electrode 3. Here, the "width dimension" refers to the dimension in the direction proceeding from the side part 5e on one side of the housing 5 to the side part 5f on the other side. As illustrated in FIGS. 3B and 3D, the through-holes 8 are formed at positions facing a lower end 3a of the metal electrode 3. Consequently, as illustrated in FIG. 3D, the lower end 3a of the metal electrode 3 can be seen through the through-holes 8. As illustrated in FIGS. 3B and 3D, the metal electrode 3 is preferably disposed to be positioned in the center of the width dimension T of the through-hole 8.

In the present embodiment, the positional relationship between the lower end 3a of the metal electrode 3 and an upper end 8a of the through-hole 8 is not limited, but as illustrated in FIG. 3B, the lower end 3a of the metal electrode 3 is preferably disposed at a position at or above the upper end 8a of the through-hole 8. Here, a "position at or above the upper end 8a" includes the position of the upper end 8a and positions higher than the upper end 8a. With this arrangement, product produced by the reaction between the metal electrode 3 and the air electrodes 4 can be discharged effectively to the outside from the through-holes 8. Also, in the present embodiment, because the air electrodes 4 are provided on both the left and right sides of the metal electrode 3, the product is generated on both the left and right sides of the metal electrode 3. For this reason, by disposing the metal electrode 3 in the center of the width dimension T of the through-hole 8 as described above, the product generated from both the left and right sides of the metal electrode 3 can be discharged to the outside through the through-holes 8 appropriately.

Also, as illustrated in FIG. 3B, the lower end 3a of the metal electrode 3 is a free end. With this arrangement, the lower end 3a of the metal electrode 3 can be made to swing. For this reason, when product has accumulated between the air electrodes 4 and the metal electrode 3, the metal electrode 3 can be made to yield, the pressing strength due to the product can be alleviated, and damage to the metal electrode 3 and the air electrodes 4 can be suppressed.

In FIG. 3D, the shape of each through-hole 8 is rectangular, but the shape is not limited to rectangular and may also be another shape. Also, in FIG. 3D, there are three through-holes 8, but the number of through-holes 8 is not limited.

The through-holes 8 function as a supply port that supplies an electrolytic solution to the liquid chamber 6, and also have a function of discharging the product produced by the reaction between the metal electrode 3 and the air electrodes 4 to the outside of the metal-air battery unit 1.

In this way, insofar as it is possible to supply the electrolytic solution and discharge the product, the position where the through-holes 8 are formed is not limited to the lower part 5b of the housing 5, and the through-holes 8 may also be provided in the front part 5c or the back part 5d of the housing 5, for example. In this case, the through-holes 8 are preferably disposed on the lower side of the front part 5c or the back part 5d. The "lower side" refers to the lower half of the height dimension of the front part 5c and back part 5d, preferably a lower portion less than or equal to ½ the height dimension, more preferably a lower portion less than or equal to ⅓ the height dimension. In this way, even if the through-holes 8 are provided in the front part 5c or the back part 5d of the housing 5, it is possible to supply an electrolytic solution 10 and discharge the product.

However, because the product falls through the liquid chamber 6 due to its own weight, forming the through-holes 8 in the lower part 5b of the housing 5 is preferable because the discharge of the product can be promoted effectively. Also, as described later, by inducing a liquid flow on the lower part 5b side of the housing 5, the discharge of the product can be promoted further.

Also, in FIG. 3D, the through-holes 8 are plurally formed at equal intervals in the width direction of the metal electrode 3 (the direction proceeding from the front part 5c toward the back part 5d of the housing 5), but a long slit-shaped through-hole 8 that communicates from the through-hole 8 on the left side to the through-hole 8 on the right side illustrated in FIG. 3D may also be formed. However, if the through-hole 8 has a long slit shape, even if the product produced by the reaction between the metal electrode 3 and the air electrodes 4 once exits to the outside through the through-hole 8, the product may easily go back inside the liquid chamber 6 through the through-hole 8 again due to a liquid flow or the like. Consequently, forming a plurality of separate through-holes 8 as illustrated in FIG. 3D is more preferable as it excels in discharging the product effectively. Note that in configurations that do not have a liquid flow, the through-hole 8 may have a long slit shape that communicates with each through-hole 8.

As illustrated in FIG. 1, a plurality of metal-air battery cells 2 are disposed in parallel, while in addition, outer wall parts 9 are affixed with adhesive or the like to the frame parts 5j of the metal-air battery cells 2 positioned on either side. As illustrated in FIG. 1 and the cross-sectional view in FIG. 4, by disposing a plurality of the metal-air battery cells 2 in parallel, the air chamber 7 that is open on top can be formed between the facing air electrodes 4 between each of the metal-air battery cells 2. Additionally, by respectively disposing the outer wall parts 9 on the outer faces of the metal-air battery cells 2 positioned on either end of the metal-air battery unit 1, as illustrated in FIG. 4, the air chamber 7 can be provided with respect to the air electrode 4 on the left side of the metal-air battery cell 2 positioned farthest to the left side and also with respect to the air electrode 4 on the right side of the metal-air battery cell 2 position farthest to the right side.

Figure 4:
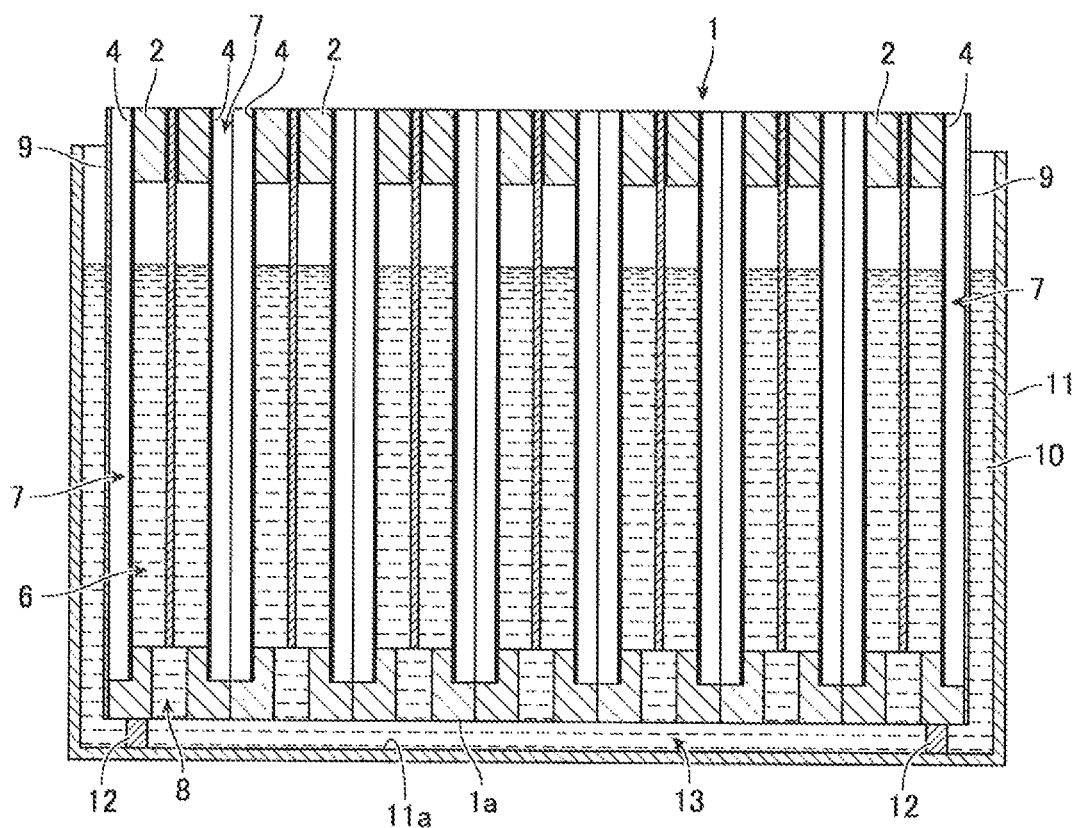
FIG. 4 is a cross-sectional view of a metal-air battery according to the present embodiment.

As illustrated in FIG. 4, the metal-air battery unit 1 illustrated in FIG. 1 is immersed in a power generation tank 11 containing the electrolytic solution 10. At this time, the electrolytic solution 10 is injected into the liquid chamber 6 through the through-holes 8. Also, as described using FIG. 3C, because the communication holes 5k leading to the liquid chamber 6 are formed between the metal electrode 3 and the slit 5g in the upper part 5a of the housing 5, when injecting the electrolytic solution 10 into the liquid chamber 6, air in the liquid chamber 6 escapes to the outside from the communication holes 5k, and therefore the electrolytic solution 10 can be smoothly guided into the liquid chamber 6 through the through-holes 8.

Also, as illustrated in FIG. 4, projecting parts 12 are provided between a bottom face 11a of the power generation tank and a lower face 1a of the metal-air battery unit 1, and a gap 13 of predetermined height is formed between the bottom face 11a of the power generation tank 11 and the lower face 1a of the metal-air battery unit 1. Consequently, the lower face 1a of the metal-air battery unit 1 does not touch the bottom face 11a of the power generation tank 11. The projecting parts 12 may be affixed to the lower face 1a of the metal-air battery unit 1 or may be affixed to the bottom face 11a of the power generation tank 11. Alternatively, projecting parts may be disposed on both the lower face 1a of the metal-air battery unit 1 and the bottom face 11a of the power generation tank 11. In this case, each of the projecting parts provided on the lower face 1a of the metal-air battery unit 1 and the bottom face 11a of the power generation tank 11 may be provided at positions facing opposite each other or at positions not facing opposite each other.

Instead of disposing the projecting parts 12, another means can also be used to provide the gap 13 between the lower face 1a of the metal-air battery unit 1 and the bottom face 11a of the power generation tank 11 as illustrated in FIG. 4. For example, the depth dimension of the power generation tank 11 may be increased beyond the height of the metal-air battery unit 1 such that even when the liquid chamber 6 of the metal-air battery unit 1 is filled with the electrolytic solution 10, the lower face 1a of the metal-air battery unit 1 is raised up from the bottom face 11a of the power generation tank 11.

As illustrated in FIG. 4, by injecting the electrolytic solution 10 into the liquid chamber 6, when the metal electrode 3 is magnesium for example, the oxidation reaction expressed by (1) below occurs near the metal electrode 3. Additionally, the reduction reaction expressed by (2) below occurs in the air electrodes 4. For a magnesium-air battery as a whole, the reaction expressed by (3) below occurs, and electricity is discharged.

$$2Mg \rightarrow 2Mg^{2+} + 4e^- \quad (1)$$

$$O_2 + 2H_2O + 4e^- \rightarrow 4OH^- \quad (2)$$

$$2Mg + O_2 + 2H_2O \rightarrow 2Mg(OH)_2 \quad (3)$$

At this time, hydrogen produced by a side reaction of the battery reaction can be discharged to the outside from the communication holes 5k leading to the liquid chamber 6 (see FIG. 3C).

Also, the product ($Mg(OH)_2$) produced during the oxidation-reduction reaction between the metal electrode 3 and the air electrodes 4 can be discharged toward the bottom face 11a side of the power generation tank 11 through the through-holes 8 provided in the lower part of each metal-air battery cell 2. Consequently, it is possible to keep the product from accumulating inside the liquid chamber 6 of each metal-air battery cell 2 and also suppress electrode damage and degradation of electrical performance, and increased lifetime can be attained.

In this way, the through-holes 8 provided in each metal-air battery cell 2 serve a role of supplying the electrolytic solution 10 to the liquid chamber 6, and also discharging the product produced by the reaction between the metal electrode 3 and the air electrodes 4 to the outside of the metal-air battery unit 1.

As above, according to the metal-air battery of the present embodiment, the air electrodes 4 are disposed on either side of the metal electrode 3 in each of the plurality of metal-air battery cells 2 configuring the metal-air battery unit 1, and each of the air electrodes 4 is disposed in an exposed state on either side of the metal-air battery cell 2. Additionally, by disposing each of the metal-air battery cells 2 in parallel, the air chamber 7 that is open on top can be formed between the exposed air electrodes 4 of each metal-air battery cell 2.

In this way, in each metal-air battery cell 2, an air chamber 7 with the surroundings completely partitioned is not formed, and instead, the present embodiment takes a cell structure in which the air chamber 7 is formed between the air electrodes 4 of each metal-air battery cell 2 by disposing a plurality of the metal-air battery cells 2 in parallel, thereby making it possible to decrease the width of the housing 5 (the width of the front part 5c and the back part 5d illustrated in FIG. 2) configuring each metal-air battery cell 2. Consequently, when forming the metal-air battery unit 1 within a predetermined width dimension (here, the "width dimension" is the dimension of the direction in which the metal-air battery cells 2 are disposed in parallel), the number of metal-air battery cells 2 disposed in parallel can be increased, and when combined with the air electrodes 4 being disposed on either side of the metal electrode 3 inside each cell described above, a high output can be obtained effectively.

Also, by providing the through-holes 8 leading to the liquid chamber 6 in the lower part 5b of each metal-air battery cell 2 and placing the metal-air battery unit 1 inside the power generation tank 11 containing the electrolytic solution 10, the electrolytic solution 10 can be injected into the liquid chamber 6, and power generation can be started. In this way, the injection of the electrolytic solution 10 into each metal-air battery cell 2 can be performed easily.

Furthermore, in the present embodiment, the discharge of the product associated with power generation through the through-holes 8 can be promoted. In the present embodiment, as illustrated in FIG. 4, when the metal-air battery unit 1 is disposed inside the power generation tank 11, the metal-air battery unit 1 is controlled to leave the gap 13 between the lower face 1a of the metal-air battery unit 1 and the bottom face 11a of the power generation tank 11, and with this arrangement, the product can be released from the liquid chamber 6 of the metal-air battery unit 1 toward the bottom face 11a side of the power generation tank 11. In this way, in the present embodiment, because the product can pass through the through-holes 8 from the liquid chamber 6 of each metal-air battery cell 2 and be released to the outside, the reaction occurring between the metal electrode 3 and the air electrodes 4 can be sustained for a long time, the voltage associated with power generation can be kept constant for a long time, and increased lifetime can be promoted.

Figure 5:
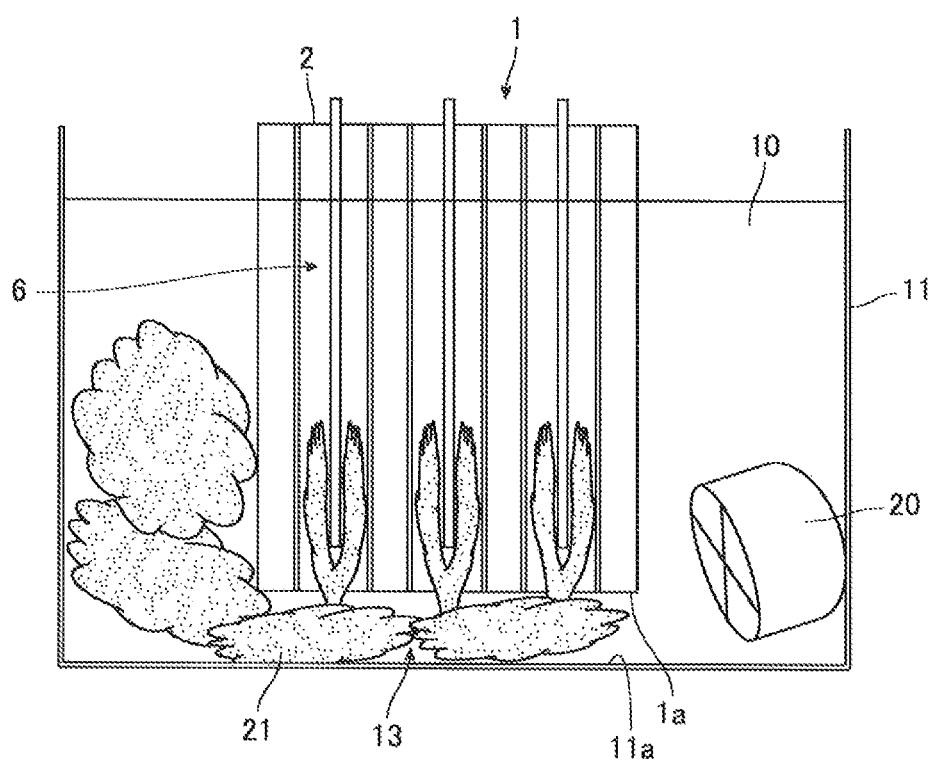
FIG. 5 is a schematic diagram of a metal-air battery for explaining a method of circulating electrolytic solution.

In the present embodiment, as illustrated in FIG. 5, it is preferable to dispose a liquid flow pump 20 that acts as a recirculation part to recirculate the electrolytic solution 10 inside the power generation tank 11, for example. In FIG. 5, the liquid flow pump 20 can be used to induce a liquid flow in the gap 13 between the lower face 1a of the metal-air battery unit 1 and the bottom face 11a of the power generation tank 11 and recirculate the electrolytic solution 10. With this arrangement, as illustrated in FIG. 5, product 21 released into the gap 13 between the lower face 1a of the metal-air battery unit 1 and the bottom face 11a of the power generation tank 11 does not accumulate at the bottom face 11a of the power generation tank 11, but instead flows to areas such as the side of the metal-air battery unit 1 and is dispersed. Also, by inducing a liquid flow in the gap 13 between the lower face 1a of the metal-air battery unit 1 and the bottom face 11a of the power generation tank 11, the speed of releasing the product 21 released into the gap 13 through the through-holes 8 can be raised, and the amount of product accumulating in the liquid chamber 6 of each metal-air battery cell 2 can be reduced more effectively.

According to the above, by inducing a liquid flow in the electrolytic solution 10 inside the power generation tank 11 like in FIG. 5, the release of the product 21 from the liquid chamber 6 of each metal-air battery cell 2 into the power generation tank 11 can be promoted, and the metal electrode 3 can be subjected the reaction until the end. In this way, in the present embodiment, it is possible to use up the metal electrode 3 until the end, a reduction in output due to long-term discharge can be suppressed, and stable output over time can be obtained more effectively.

Also, the metal electrode 3 is preferably supported by the housing 5 in a replaceable way, such that in cases where the metal electrode 3 is used up or the like, a new metal electrode 3 can be disposed inside a metal-air battery cell 2. With this arrangement, stable output over time can be obtained even more effectively. For example, it may be configured such that the metal electrode 3 can be slidably inserted into the metal-air battery cell 2 from the outside, and when inserted to a predetermined position, the metal electrode 3 cannot be inserted any farther.

The above describes replacing the metal electrodes 3, but the metal-air battery cells 2 may also be replaced appropriately before or after power generation ends. In this way, by appropriately replacing the metal electrodes 3 or the metal-air battery cells 2, it is made possible to achieve continuous power generation while being a primary battery. Also, in the present embodiment, it is possible to circulate the electrolytic solution as described later, thereby making it possible to use electrolytic solution with few impurities (few reaction products) for a long time. This also serves a role of supporting the continuous power generation effect. Note that from the perspective of workability and housing design, it is more preferable for the metal-air battery cells 2 to be supported in a replaceable way. In other words, to replace the metal electrode 3, the cell structure may easily become more complicated to enable the replacement of only the metal electrode 3 in the metal-air battery cell 2. Alternatively, a slit or the like is provided in the upper part of the metal-air battery cell 2, and a structure making it possible to retrieve only the metal electrode 3 must be provided, and furthermore, dirt and the like may easily become mixed in during replacement. On the other hand, if the metal-air battery cell 2 is replaced, each entire cell unit itself can be replaced, workability can be improved, and the housing design is can also be simplified.

Figure 6:
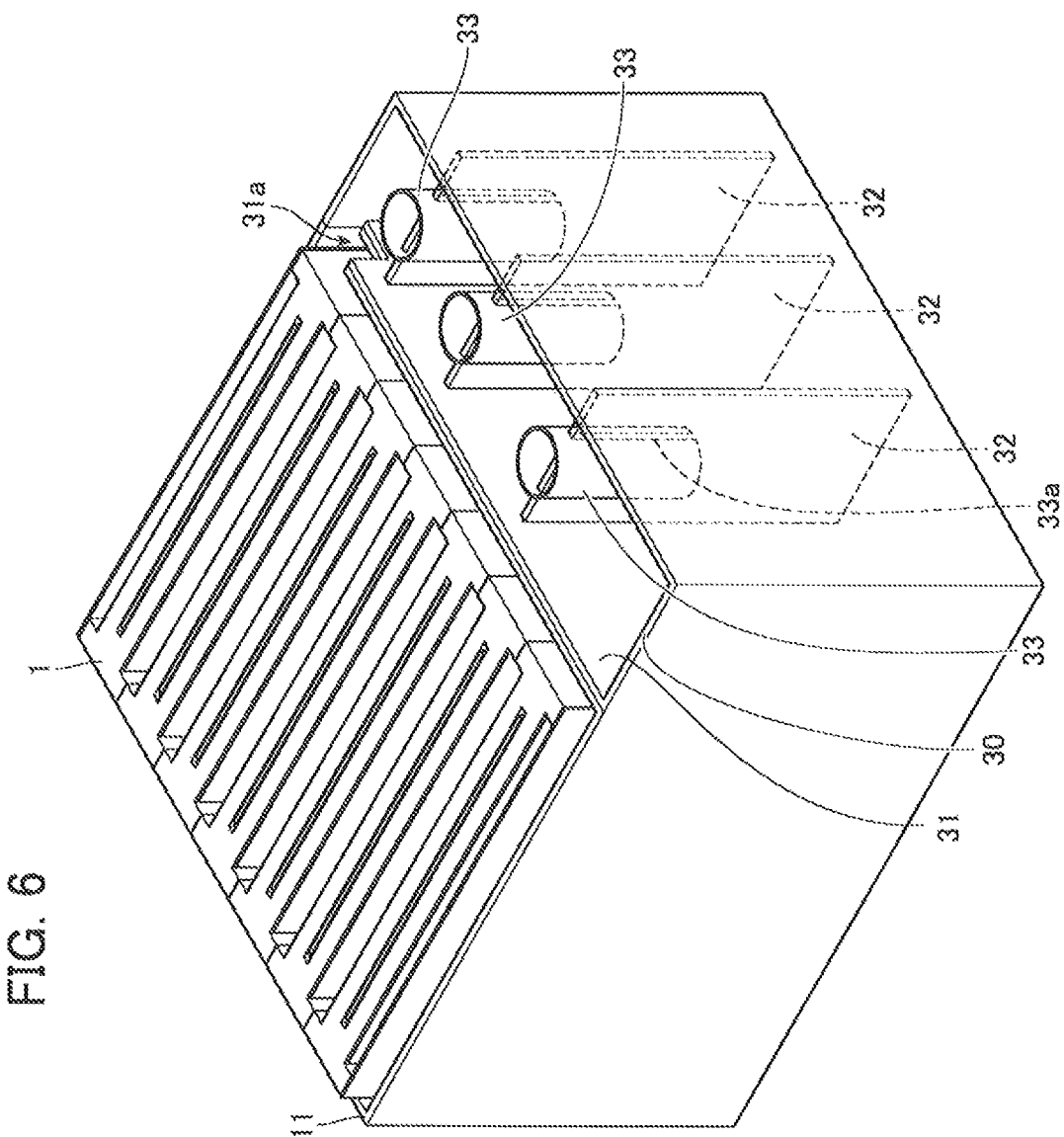
FIG. 6 is a perspective view of a metal-air battery provided with a precipitation tank according to the present embodiment.

In the metal-air battery illustrated in FIG. 6, a precipitation tank (collector) 30 is provided beside the power generation tank 11 in which the metal-air battery unit 1 is disposed. As illustrated in FIG. 6, the power generation tank 11 and the precipitation tank 30 are partitioned by a partition plate 31. Note that the partition plate 31 is provided with a notch 31a, and electrolytic solution recirculated through the precipitation tank 30 can flow from the notch 31a into the power generation tank 11.

Figure 7:
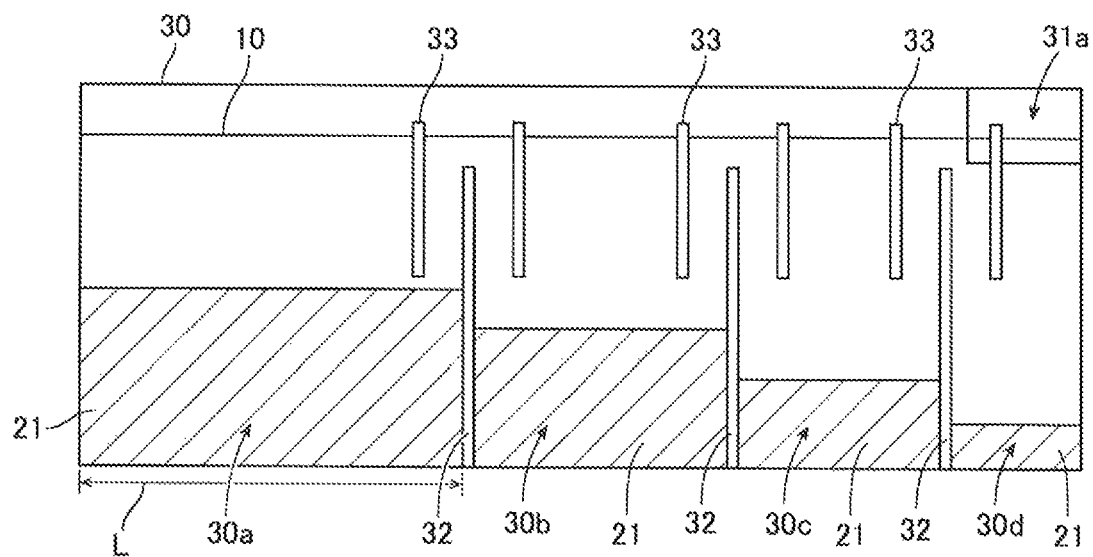
FIG. 7 is a cross-sectional view inside the precipitation tank illustrated in FIG. 6.

As illustrated in FIGS. 6 and 7, the precipitation tank 30 is provided with a plurality of partitions 32 spaced at intervals in the recirculation direction of the electrolytic solution, and a plurality of precipitation chambers 30a, 30b, 30c, and 30d partitioned by the outer walls of the precipitation tank 30 and the partitions 32 are formed. In order from the side distant from the notch 31a proceeding toward the side near the notch 31a, the precipitation chambers are designated the first precipitation chamber 30a, the second precipitation chamber 30b, the third precipitation chamber 30c, and the fourth precipitation chamber 30d. As illustrated in FIG. 7, a length dimension L of each precipitation chamber (in FIG. 7, the length dimension L is indicated for the first precipitation chamber 30a as a representative example) is gradually smaller in order of the first precipitation chamber 30a, the second precipitation chamber 30b, the third precipitation chamber 30c, and the fourth precipitation chamber 30d.

Also, as illustrated in FIGS. 6 and 7, the height of the partitions 32 is set lower than the height of the outer walls of the precipitation tank 30 and the partition plate 31 (except at the position of the notch 31a).

As illustrated in FIG. 6, tubular bodies 33 are respectively disposed in the upper part of each of the partitions 32. As illustrated in FIG. 6, a slit 33a is formed in each tubular body 33, and the tubular body 33 is fixed and supported on each partition 32 through the slit 33a.

Electrolytic solution impure with product inside the power generation tank 11 is sent to the first precipitation chamber 30a by using a means such as a pump not illustrated. Also, in the precipitation tank 30, a liquid flow occurs such that the electrolytic solution flows from the first precipitation chamber 30a toward the fourth precipitation chamber 30d. As illustrated in FIG. 7, when the electrolytic solution moves from the first precipitation chamber 30a to the second precipitation chamber 30b, some of the product 21 contained within the electrolytic solution precipitates in the first precipitation chamber 30a, and accumulates at the bottom part of the first precipitation chamber 30a. Thereafter, the supernatant of the electrolytic solution is sent in order from the first precipitation chamber 30a to the second precipitation chamber 30b, the third precipitation chamber 30c, and the fourth precipitation chamber 30d, and each time, the product 21 contained in the electrolytic solution accumulates at the bottom of each precipitation chamber. At this time, the amount of product that accumulates at the bottom of each precipitation chamber gradually decreases from the first precipitation chamber 30a to the fourth precipitation chamber 30d. For this reason, it is preferable to form the longest length dimension L in the first precipitation chamber 30a where the product 21 easily accumulates, and gradually shorten the length dimension L in order of the second precipitation chamber 30b, the third precipitation chamber 30c, and the fourth precipitation chamber 30d, and thereby improve the effect of collecting the product 21.

In the present embodiment, the tubular bodies 33 are disposed in the upper part of each partition 32, and as illustrated in FIG. 7, the surface of the electrolytic solution 10 sent from the power generation tank 11 to the precipitation tank 30 lies at a position lower than the upper part of each tubular body 33. At this time, by recirculating the supernatant of the electrolytic solution 10 through a channel inside the tubular bodies 33, the precipitation of the product 21 can be promoted. Note that the tubular bodies 33 do not have to be cylindrical, are barricades for blocking the supernatant from moving directly into the adjacent tank, and are for the purpose of lowering the speed of the liquid flowing through the tank to promote precipitation.

In this way, in the precipitation tank 30, by recirculating the supernatant of the electrolytic solution 10 and returning the electrolytic solution 10 from which the product 21 has been removed as much as possible back to the power generation tank 11 from the notch 31a, a reduction in output over time can be suppressed more effectively, and stable output over time can be attained. Also, as described already, in the present embodiment, it is possible to replace the metal electrode 3 and the metal-air battery cells 2 appropriately, and when combined with the use of an electrolytic solution with few impurities (few reaction products) over a long time, it is possible to generate power continuously more effectively.

Note that instead of the precipitation tank 30, or in addition to the precipitation tank 30, illustrated in FIGS. 6 and 7, a filtering device (collector) or the like may be provided separately to collect the product 21 and extend the lifetime of the electrolytic solution 10. The filtering device can also be disposed inside the power generation tank or inside a tank provided separately from the power generation tank.

When it is desirable to end power generation, by lifting the metal-air battery unit 1 from the state in FIG. 4 and draining the electrolytic solution 10 out of the liquid chamber 6 in each metal-air battery cell 2 through the through-holes 8, power generation can be stopped easily. Alternatively, power generation may also be stopped by draining the electrolytic solution 10 from the power generation tank 11 in the state with the metal-air battery unit 1 disposed inside. Furthermore, the battery reaction can also be stopped by removing the metal electrode that acts as the anode.

In addition, a roof part not illustrated may also be provided on the upper face of the metal-air battery unit 1 illustrated in FIG. 1. The roof part may also be provided with openings that lead to each air chamber 7 to allow air to flow into each air chamber 7 through the openings in the roof part.

Also, an external connection terminal that supplies battery output to the outside may also be installed on the roof part described above. The external connection terminal may be a connector or a USB port, or the like, but is not particularly limited. A plurality of external connection terminals can be provided. For example, a mobile device can be connected directly to an external connection terminal provided on the metal-air battery unit 1 and be supplied with power. As another example, a connection substrate such as a USB hub can also be connected to an external connection terminal of the metal-air battery unit 1 to form a configuration that supplies power to multiple mobile devices through the connection substrate.

According to the metal-air battery of the present embodiment described above, the development of an emergency power source led to the development of the present embodiment in particular from the perspective of being able to install a large number of a cells while saving space and also achieving high output and stable output over time. Namely, in the metal-air battery of the present embodiment, by disposing facing air electrodes on either side of a metal electrode and also increasing the number of cells provided in parallel, high output can be obtained. Also, to suppress a reduction in output over time more effectively, the discharge of product associated with power generation can be promoted effectively. Furthermore, while being a primary battery, the metal electrode or metal-air battery cell is replaceable, and continuous power generation is made possible without being single-use like the related art.

The metal-air battery of the present embodiment can be used as a space-saving emergency power source, and can also be applied in an office, a factory, a plant, or the like.

In the present embodiment, each of the electrodes of each of the metal-air battery cells 2 may be connected in series or connected in parallel, and the wiring method is not particularly limited.

Also, the configuration of the precipitation tank 30 illustrated in FIGS. 6 and 7 is one example, and the embodiment is not limited to such a configuration. For example, in FIGS. 6 and 7, there are four precipitation chambers, but the number of precipitation chambers is not limited thereto. Also, a different recirculating means may be used instead of the tubular bodies 33, or in addition to the tubular bodies 33, to promote the recirculation of the electrolytic solution.

Also, regarding the method of using the metal-air battery according to the present embodiment, the metal-air battery unit 1 may be placed into the power generation tank 11 containing the electrolytic solution 10 to start power generation, or alternatively, the metal-air battery unit 1 may be disposed in the power generation tank 11 in advance, or manually by a user or the like, and power generation may be started by filling the power generation tank 11 with the electrolytic solution 10 while taking care so that the electrolytic solution 10 does not enter the air chambers 7.

Also, in the present embodiment, the metal electrode 3 or metal-air battery cell 2 is supported by the housing 5 in a replaceable way. Additionally, in the method of using the metal-air battery according to the present embodiment, the continuation of power generation is possible while replacing the metal electrode 3 or metal-air battery cell 2. Note that the "continuation of power generation" here means that power generation can be extended compared to an ordinary primary battery, and is defined such that even if power generation is stopped during replacement, the "continuation of power generation" is achieved before and after the replacement. From the perspective of workability during replacement, it is preferable to make the metal-air battery cells 2 replaceable, and power generation can be continued smoothly by replacing the metal-air battery cells 2.

Figure 8:
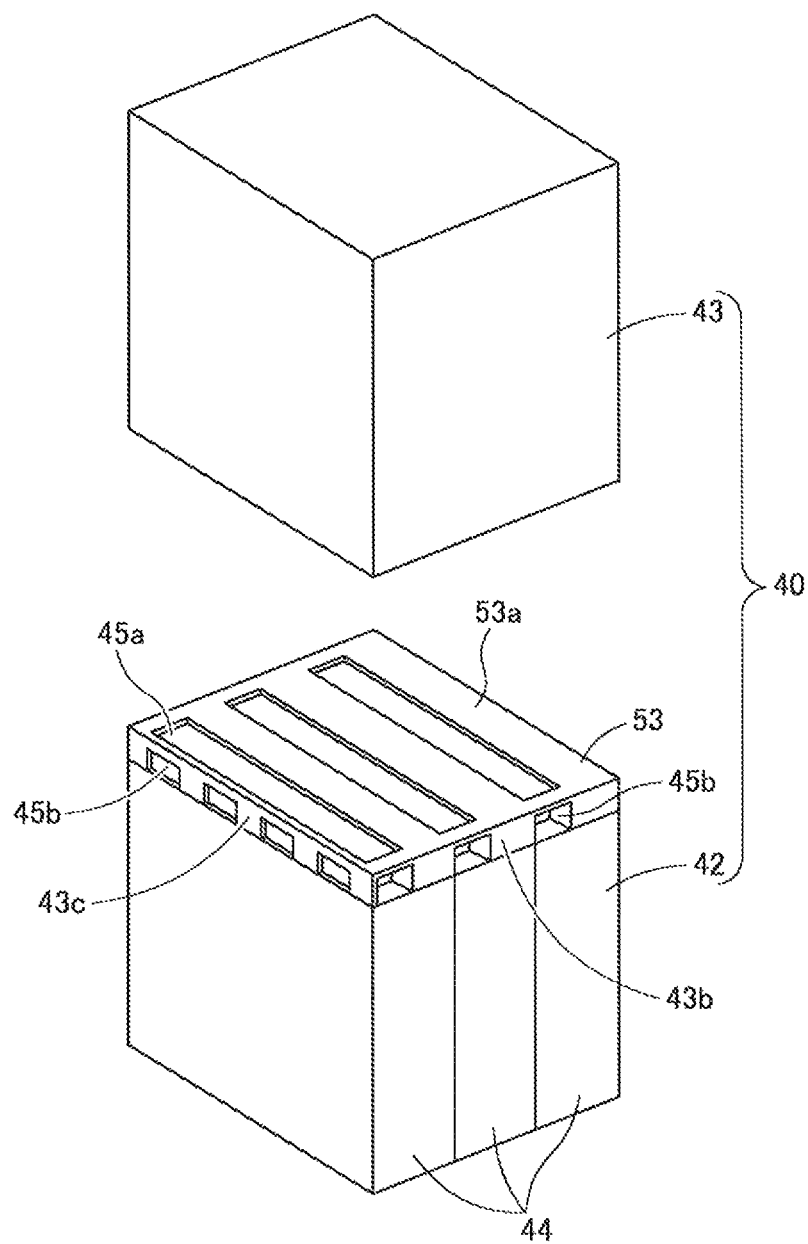
FIG. 8 is a perspective view of a metal-air battery according to another embodiment.

A metal-air battery according to an embodiment different from the above will be described. As illustrated in FIG. 8, a metal-air battery 40 is configured to include a metal-air battery unit 42 and a case 43.

As illustrated in FIG. 8, the metal-air battery unit 42 contains three metal-air battery cells 44 provided in parallel, for example. The number of metal-air battery cells 44 is not limited, and may also be two, or four or more.

The metal-air battery unit 42 is a combination of a plurality of metal-air battery cells 44 having the same structure. The structure of the metal-air battery cell 44 will be described in detail later.

As illustrated in FIG. 8, a roof part 53 is attached to the upper faces of the three metal-air battery cells 44. The roof part 53 is provided with first openings 45a in an upper face 53a, for example. Also, as illustrated in FIG. 8, second openings 45b are formed in a side face (the left side face illustrated in FIG. 1) of the roof part 53. In addition, although not illustrated, openings may also be provided on the back face and the right side face of the roof part 53.

However, the numbers and formation positions of the first openings 45a and the second openings 45b illustrated in FIG. 8 are merely one example. In other words, each opening may be a single opening or may be a plurality of openings. Furthermore, a configuration can be taken in which at least one of the first openings 45a and the second openings 45b is not formed. Also, the roof part 53 does not have to be provided, or another component member may be provided instead of the roof part 53.

The openings 45a and 45b illustrated in FIG. 8 are air holes, but an external connection terminal (not illustrated) that supplies battery output to the outside may also be installed at the position of each second opening 45b, for example. The external connection terminal may be a connector or a USB port, or the like, but is not particularly limited. A plurality of external connection terminals can be provided. For example, a mobile device can be connected directly to an external connection terminal provided on the metal-air battery unit 42 and be supplied with power. As another example, a connection substrate such as a USB hub can be connected to an external connection terminal of the metal-air battery unit 42 to form a configuration that supplies power to multiple mobile devices through the connection substrate.

As described later, the case 43 illustrated in FIG. 8 can be made to function as a container capable of containing an electrolytic solution, but when storing the metal-air battery 40 without it being used, the case 43 illustrated in FIG. 8 is used to cover the metal-air battery unit 42 from above, for example. With this arrangement, the metal-air battery unit 42 can be protected such that dirt and the like does not enter through the openings 45a and 45b.

Also, the case 43 can be structured such that when the metal-air battery unit 42 is covered from above, the case 43 and the metal-air battery unit 42 are unified while maintaining a space in between. At this time, if a handle is attached to the outer surface of the case 43, the metal-air battery 40 can be carried conveniently.

The shape of the case 43 is not limited, but the external form of the case 43 is preferably a shape similar to the metal-air battery unit 42 and also slightly larger than the metal-air battery unit 42.

Figure 9:
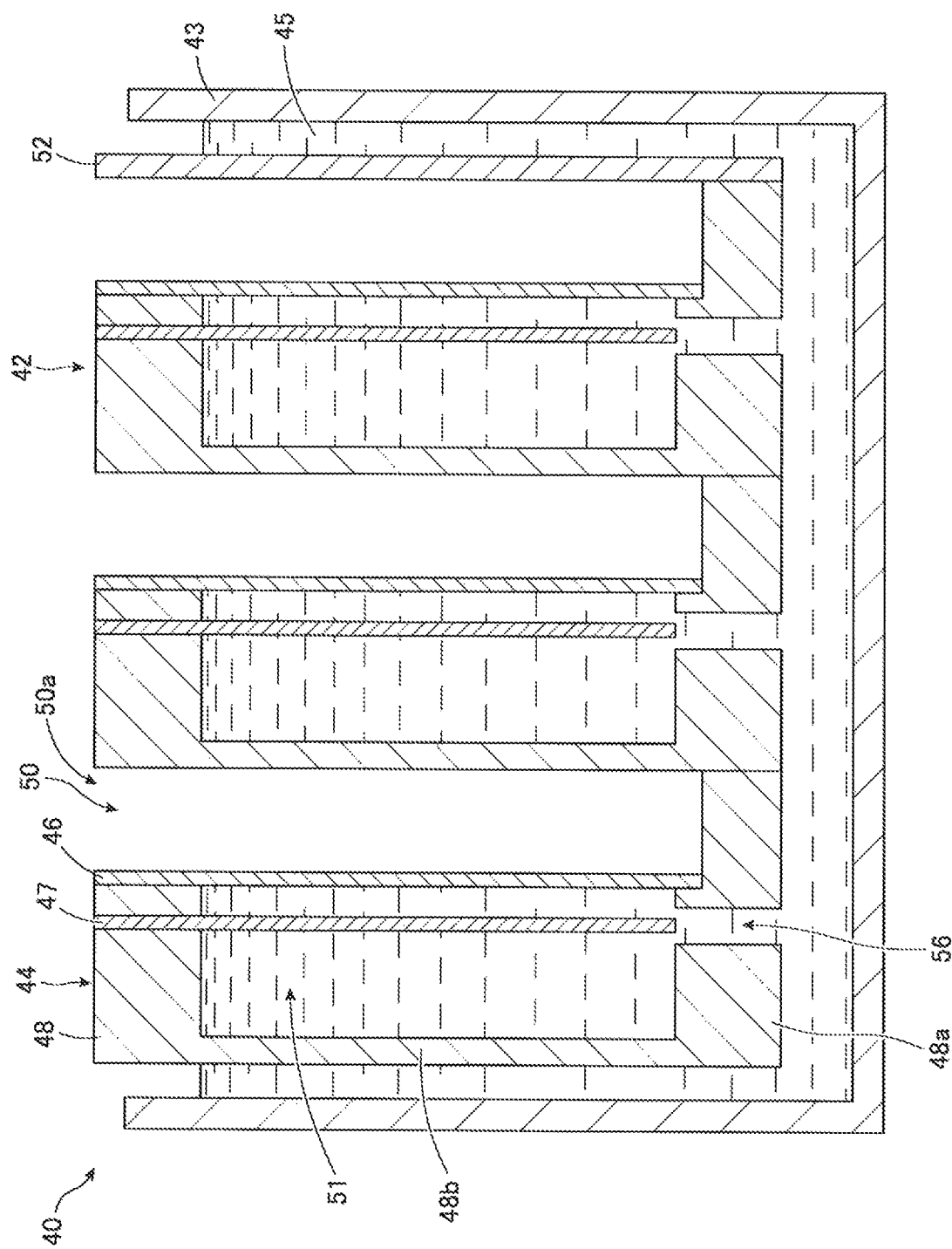
FIG. 9 is a cross-sectional view of a metal-air battery according to another embodiment.

FIG. 9 is a cross-sectional view of the metal-air battery 40 in a state in which the case 43 is inverted from the state in FIG. 8, and the metal-air battery unit 42 is placed inside the case 43 containing an electrolytic solution 45.

As illustrated in FIG. 9, each metal-air battery cell 44 is configured to include an air electrode 46, a metal electrode 47, and a housing 48. As illustrated in FIG. 9, the air electrode 46 and the metal electrode 47 are each supported by the housing 48. The air electrode 46 and the metal electrode 47 are disposed facing each other in the horizontal direction (the left-to-right direction on the page) and spaced apart by a predetermined interval.

As illustrated in FIG. 9, the housing 48 of each metal-air battery cell 44 is provided with an air chamber 50 and a liquid chamber 51. As illustrated in FIG. 9, the upper part of each air chamber 50 configures an opening 50a that is open to the outside. Note that in FIG. 9, the roof part 53 illustrated in FIG. 8 is not illustrated. Air is guided into the air chamber 50 illustrated in FIG. 9 from the openings 45a and 45b in the roof part 53 illustrated in FIG. 8.

Note that in the embodiment illustrated in FIG. 9, the right side faces of each air chamber 50 of the metal-air battery cell 44 on the left side of the drawing and the metal-air battery cell 44 in the center of the drawing are respectively configured by the side face of the housing 48 of the metal-air battery cell 44 adjacent to the right. In this way, by using the housing 48 of the adjacent metal-air battery cell 44 to supplement a portion of the side face of the air chamber 50, the thickness of each metal-air battery cell 44 can be reduced, a more compact metal-air battery unit 42 can be achieved, and by extension, a more compact metal-air battery 40 can be achieved. However, the right side face of the air chamber 50 of the metal-air battery cell 44 positioned on the right side of the drawing illustrated in FIG. 9 is formed by newly disposing a side wall part 52.

As illustrated in FIG. 9, the air electrode 46 is disposed between the air chamber 50 and the liquid chamber 51. At this time, preferably, each of the upper part, lower part, and side part of the air electrode 46 are fixed and supported by the housing 48. As illustrated in FIG. 9, the air electrode 46 is disposed in a state exposed to both the air chamber 50 and the liquid chamber 51.

As illustrated in FIG. 9, the metal electrode 47 is disposed at a position distanced from the air electrode 46 by a predetermined distance inside the liquid chamber 51. As illustrated in FIG. 9, the upper part of the metal electrode 47 is affixed to the housing 48, but the lower part is a free end (not fixed).

As illustrated in FIG. 9, a bottom part 48a of the housing 48 is provided with a through-hole (liquid inlet) 56 leading to the liquid chamber 51. Therefore, as illustrated in FIG. 9, when the metal-air battery unit 42 is immersed in the case 43 filled with the electrolytic solution 55, the electrolytic solution 55 is injected into each liquid chamber 51 at the same time through the through-hole 56. At this time, as illustrated in FIG. 9, the water level of the electrolytic solution 55 is lower than the opening 50a of the air chamber 50, and the electrolytic solution 55 does not flow into the air chamber 50.

Note that in the embodiment illustrated in FIG. 9, the through-hole 56 is provided in the bottom part 48a of the housing 48, but the through-hole 56 may also be provided in a side part 48b of the housing 48, or in both the bottom part 48a and the side part 48b, for example. Additionally, it is also possible to provide the through-hole 56 in an upper part of the housing 48, but in this case, the through-hole 56 needs to be positioned lower than the opening 50a of the air chamber 50.

Also, although not illustrated, holes through which generated gas such as hydrogen produced by the battery reaction are discharged from the liquid chamber 51 to the outside are provided around the metal electrode 47.

Figure 10:
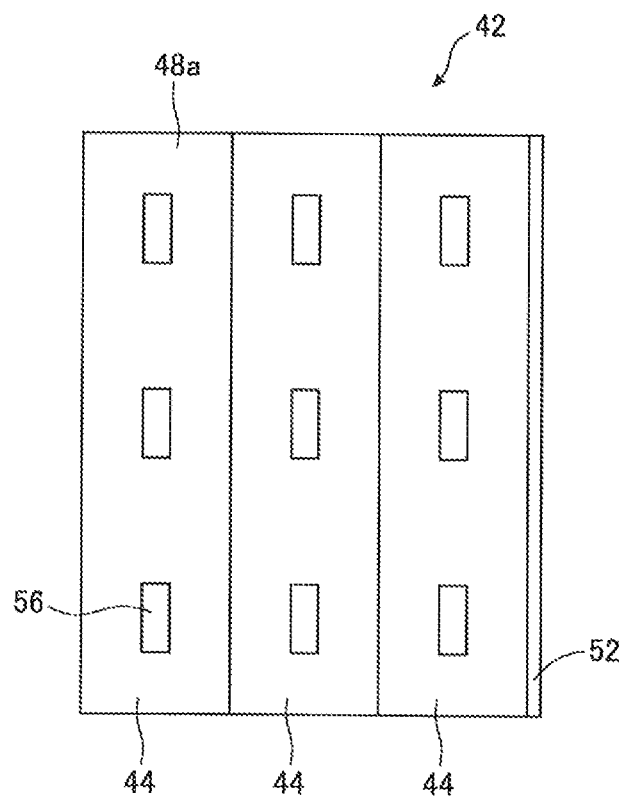
FIG. 10 is a bottom view of a metal-air battery unit according to another embodiment.

To rapidly supply the electrolytic solution 55 to the liquid chamber 51 of each metal-air battery cell 44, it is preferable to provide the through-hole 56 in the bottom part 48a of the housing 48. Also, as illustrated in FIG. 10, a plurality of through-holes 56 can be provided with respect to the bottom part 48a of each metal-air battery cell 44. Note that the number of through-holes 56 is not limited. Also, the shape of the through-hole 56 is not limited, and may be a structure provided with a plurality of small holes as illustrated in FIG. 10, or a structure in which at least one elongated through-hole 56 is provided in each metal-air battery cell 44, for example.

As illustrated in FIG. 9, the metal electrode 47 is preferably disposed facing the through-hole 56 provided in the bottom part 48a of the housing 48. Product produced during the oxidation-reduction reaction between the metal electrode 47 and the air electrode 46 is easily released to the case 43 side through the through-hole 56. With this arrangement, it is possible to suppress electrode damage and degradation of electrical performance due to the accumulation of the product inside each metal-air battery cell 44.

For example, the through-hole 56 may be disposed in a lower portion of the side part 48b of the housing 48, and the metal electrode 47 may be disposed facing the through-hole 56. The "lower portion of the side part 48b" refers to the lower half of the height dimension of the side part 48b, preferably a lower portion less than or equal to ½ the height dimension, more preferably a lower portion less than or equal to ⅓ the height dimension. With this arrangement, an effect of releasing the product can also be obtained. Note that the position of the through-hole 56 is not limited insofar as the liquid chamber 51 can be filled with the electrolytic solution 55 when placing the metal-air battery unit 42 into the case 43, such that the electrolytic solution 55 inside the case 43 does not reach the upper part of the metal-air battery unit 42.

Also, as illustrated in FIG. 9, the lower part of the metal electrode 47 is treated as a free end. With this arrangement, the metal electrode 47 can be disposed facing the through-hole 56 appropriately. Also, by treating the lower part of the metal electrode 47 as a free end, the lower part of the metal electrode 47 can be made to swing. For this reason, when product has accumulated between the air electrode 46 and the metal electrode 47, the metal electrode 47 can be made to yield, the pressing strength due to the product can be alleviated, and damage to the metal electrode 47 and the air electrode 46 can be suppressed.

According to the metal-air battery 40 according to the present embodiment, as illustrated in FIG. 8, a plurality of metal-air battery cells 44 having the same structure having the air electrode 46, the metal electrode 47, and the housing 48 are provided in parallel. Also, as illustrated in FIG. 9, the air chamber 50 of each metal-air battery cell 44 is shaped to be open not only on top but also on the side part of the side away from the liquid chamber 51 (the right side in the drawing). Moreover, in addition to providing the plurality of metal-air battery cells 44 in parallel, the side wall part 52 is disposed with respect to the metal-air battery cell 44 farthest on the end. In this way, in the present embodiment, the metal-air battery unit 42 is configured to be a combination of two types of components, namely a compound component configuring the metal-air battery cell 44, and the side wall part 52. Note that a "compound component" means a component containing a plurality of members including the electrodes and the housing that configures the metal-air battery cell 44.

With the metal-air battery 40 according to the embodiment illustrated in FIGS. 8 and 9, like the metal-air battery according to the embodiment illustrated in FIG. 1 and the like, the number of cells disposed in parallel can be increased, making it possible to obtain high output. In other words, in the present embodiment, the metal-air battery unit 42 can be formed using a simple structure with few components. Also, the air chamber 50 that is open only on top can be formed appropriately in each thin metal-air battery cell 44, and a more compact metal-air battery unit 42 provided with a plurality of the metal-air battery cells 44 can be achieved. Also, to suppress a reduction in output over time more effectively, the discharge of product associated with power generation can be promoted effectively.

In the present embodiment, as illustrated in FIG. 9, the electrolytic solution 55 is poured into the case 43, and then the metal-air battery unit 42 is immersed in the case 43. At this time, the electrolytic solution 55 naturally enters the liquid chamber 51 of each metal-air battery cell 44 through the through-hole 56, and fills the liquid chamber 51. In this way, because the user does not have to inject the electrolytic solution 55 directly into each metal-air battery cell 44, and it is sufficient for the user to simply place the metal-air battery unit 42 into the case 43 containing the electrolytic solution 55, the injection of the electrolytic solution 55 into each metal-air battery cell 44 can be simplified. Also, according to the present embodiment, the through-hole 56 leading to each liquid chamber 51 can be formed with a simple structure with respect to the plurality of metal-air battery cells 44.

Also, in the present embodiment, by lifting the metal-air battery unit 42 from the state in FIG. 9 and causing the electrolytic solution 55 to drain out of the liquid chamber 51 in each metal-air battery cell 44 through the through-hole 56, power generation can be stopped easily.

In the present embodiment, the case 43 illustrated in FIG. 8 is a container capable of containing the electrolytic solution 55. Consequently, because power is generated by inverting the case 43 illustrated in FIG. 8, pouring the electrolytic solution 55 into the case 43, and immersing the metal-air battery unit 42 in the electrolytic solution 55 inside the case 43, the user is able to use the metal-air battery 40 rapidly in an emergency such as a disaster. Note that it is beneficial to provide a mark to indicate the water level of the electrolytic solution 55 to pour into the case 43. This arrangement enables the user to pour an appropriate amount of the electrolytic solution 55 into the case 43.

In the metal-air battery 40 illustrated in FIGS. 8 to 10, it is possible to apply the power generation tank 11 and the precipitation tank 30 illustrated in FIGS. 5 to 7. In this way, in the metal-air battery 40, a portion of the configuration of the metal-air battery illustrated in FIG. 1 and the like can be used where appropriate.

Also, a magnesium-air battery or another type of metal-air battery is applicable as the metal-air battery according to the present embodiment.

Hereinafter, advantages of the present invention will be described using experimental examples of the present invention. Note that an embodiment of the present invention is not limited in any way by the following experimental examples.

Figure 11:
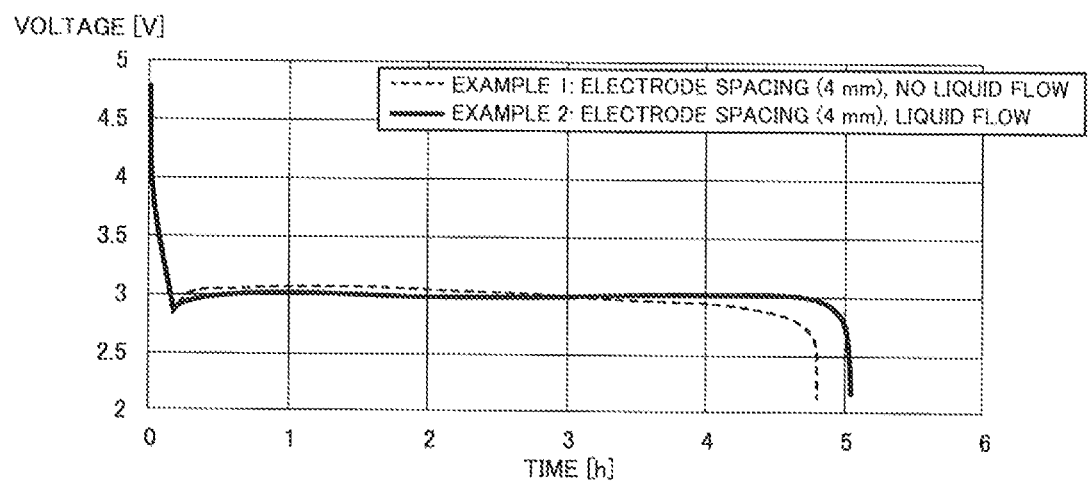
FIG. 11 is a graph illustrating the relationship between time and voltage in a constant current discharge experiment.

FIG. 11 illustrates the experimental results of a constant current discharge experiment. The structure illustrated in FIG. 1 having three metal-air battery cells provided in parallel was adopted as the metal-air battery unit used in the experiment. The configuration of each metal-air battery cell was made to be similar to FIGS. 2 and 3. Also, the interval between the metal electrode and the air electrodes was set to 4 mm. In Experimental Example 1, a liquid flow was not induced in the electrolytic solution. On the other hand, in Experimental Example 2, a liquid flow was induced in the electrolytic solution.

As the experimental results illustrated in FIG. 11 demonstrate, in Experimental Example 2 with an induced liquid flow, a reduction in output over time was found to be able to be suppressed compared to Experimental Example 1 without an induced liquid flow. By inducing a liquid flow in this way, the electrolytic solution is discharged more easily to the outside from the inside of the metal-air battery cells, and the reaction between the metal electrode and the air electrodes can be sustained more effectively.

Also, the three samples indicated below were prepared.
Example 1: Through-hole+no circulation
Example 2: Through-hole+circulation
Comparative Example 1: No through-hole
Note that the interval between the metal electrode and the air electrodes of each sample was uniformly set to 4 mm.

In the "Stability over time" of the output indicated in Table 1 below, "Excellent" indicates a state that the output was stable until the end, "Good" means a state that the output was stable almost until the end, and "Poor" means a state that the output dropped over time. Also, in the "Output duration" indicated in Table 1, "Excellent" means a state that the expected output duration was secured, "Good" means a state that the expected output duration was mostly secured, and "Poor" means a state that the output duration was short.

TABLE 1

|  | Comparative Example | Example 1 | Example 2 |
| --- | --- | --- | --- |
| Through-hole | N | Y | Y |
| Circulation | — | N | Y |
| Stability over time | Poor | Good | Excellent |
| Output duration | Poor | Good | Excellent |

As indicated in Table 1, in Example 1 and Example 2, both the stability over time of the output and the output duration are "Excellent" or "Good", and favorable results were obtained. Note that between Example 1 and Example 2, Example 2 with added circulation exhibited more favorable results with respect to both the stability over time of the output and the output duration compared to Example 1 (see Example 1 and Example 2). On the other hand, in Comparative Example 1 that lacks a through-hole, both the stability over time of the output and the output duration are "Poor", and stable output along with saving space could not be obtained, demonstrating that Comparative 1 is inferior to Example 1 and Example 2 as an emergency power source.

The metal-air battery of the present invention can be used as an emergency power source exhibiting high output as well as excellent stability of the output over time.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A metal-air battery comprising:
a metal-air battery unit provided with a plurality of metal-air battery cells in parallel, each metal-air battery cell being configured to include:
a metal electrode,
air electrodes disposed facing each other on either side of the metal electrode, and
a housing that supports the metal electrode and the air electrodes,
wherein the air electrodes are exposed on an outer face on either side of the housing,
wherein a liquid chamber is formed in each metal-air battery cell, and in the metal-air battery unit combining the plurality of metal-air battery cells, an air chamber that is open on top is formed between the facing air electrodes of each of the metal-air battery cells, and
wherein a through-hole is formed in each metal-air battery cell, the through-hole functioning as a supply port that communicably connects with the liquid chamber and supplies an electrolytic solution to the liquid chamber, and the through-hole also functioning as a discharge port that can release a product produced by a reaction between the metal electrode and the air electrodes to the outside of the metal-air battery unit.

2. The metal-air battery according to claim 1, wherein a lower end of the metal electrode is supported by the housing as a free end, the through-hole is formed in a bottom part of the housing, and the lower end of the metal electrode and an upper end of the through-hole face each other.

3. The metal-air battery according to claim 2, wherein the lower end of the metal electrode is disposed in a position at or above the upper end of the through-hole.

4. The metal-air battery according to claim 1, wherein side parts on either side of the housing where the air electrodes are disposed are configured to include a securing part that secures the air electrodes, and a frame part that surrounds an outer perimeter of the securing part except on top and projects out farther than the securing part,
the air electrodes are affixed to the securing part, and
the frame parts of the metal-air battery cells abut each other to form the air chamber that is open on top.

5. The metal-air battery according to claim 1, wherein the metal electrode or the metal-air battery cell is supported by the housing in a replaceable way.

6. The metal-air battery according to claim 1 further including:
a power generation tank capable of containing an electrolytic solution, wherein
in a state in which the metal-air battery unit is placed inside the power generation tank containing the electrolytic solution with the open top of the air chamber facing upward and a gap is formed between a lower face of the metal-air battery unit and a bottom face of the power generation tank, the electrolytic solution is injected into the liquid chamber through the through-hole, and the product is discharged through the through-hole and into the gap.

7. The metal-air battery according to claim 6, comprising:
a circulating part that circulates the electrolytic solution in the power generation tank.

8. The metal-air battery according to claim 6, comprising:
a collector that collects the product discharged into the power generation tank.

9. A method of using the metal-air battery as defined in claim 1; and
starting power generation by placing the metal-air battery unit into a power generation tank containing an electrolytic solution in a state with the open top of the air chamber facing upward such that an interval is formed between a lower face of the metal-air battery unit and a bottom face of the power generation tank, or by pouring the electrolytic solution into the power generation tank in which the metal-air battery unit has been disposed.

10. The method of using a metal-air battery according to claim 9, wherein
a liquid flow is created inside the power generation tank, and power is generated while circulating the electrolytic solution.

11. The method of using a metal-air battery according to claim 9, wherein
power is generated while collecting a product discharged into the power generation tank.

12. The method of using a metal-air battery according to claim 9, wherein
power generation is continued while replacing the metal electrode or the metal-air battery cells.

* * * * *